March 24, 1936. W. F. MESINGER 2,035,396
METHOD AND APPARATUS FOR DISPENSING GAS MATERIAL
Filed March 1, 1935 4 Sheets-Sheet 1
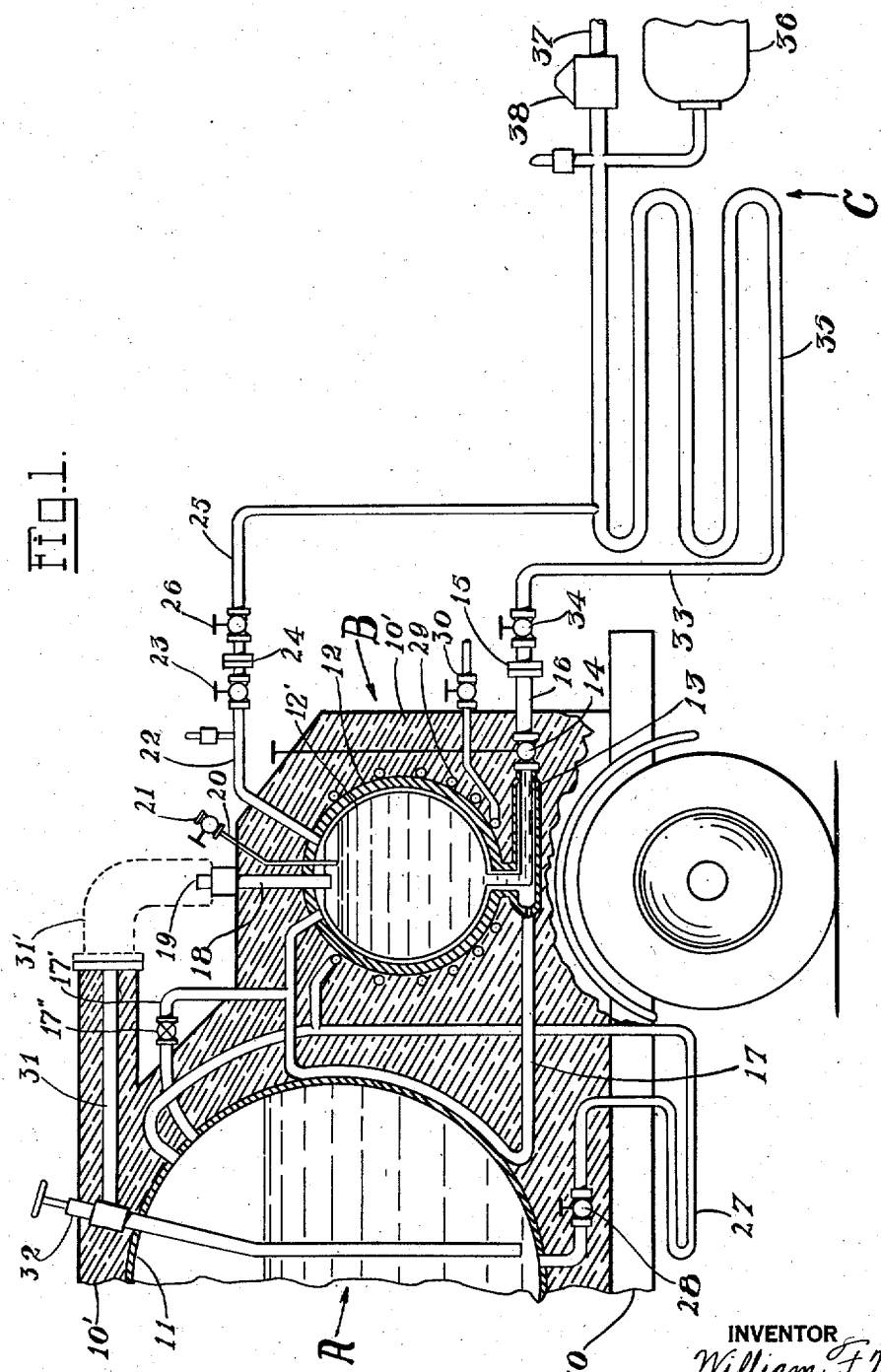
INVENTOR
William F. Mesinger
BY Watson, Bristol, Johnson & Leavenworth
ATTORNEYS

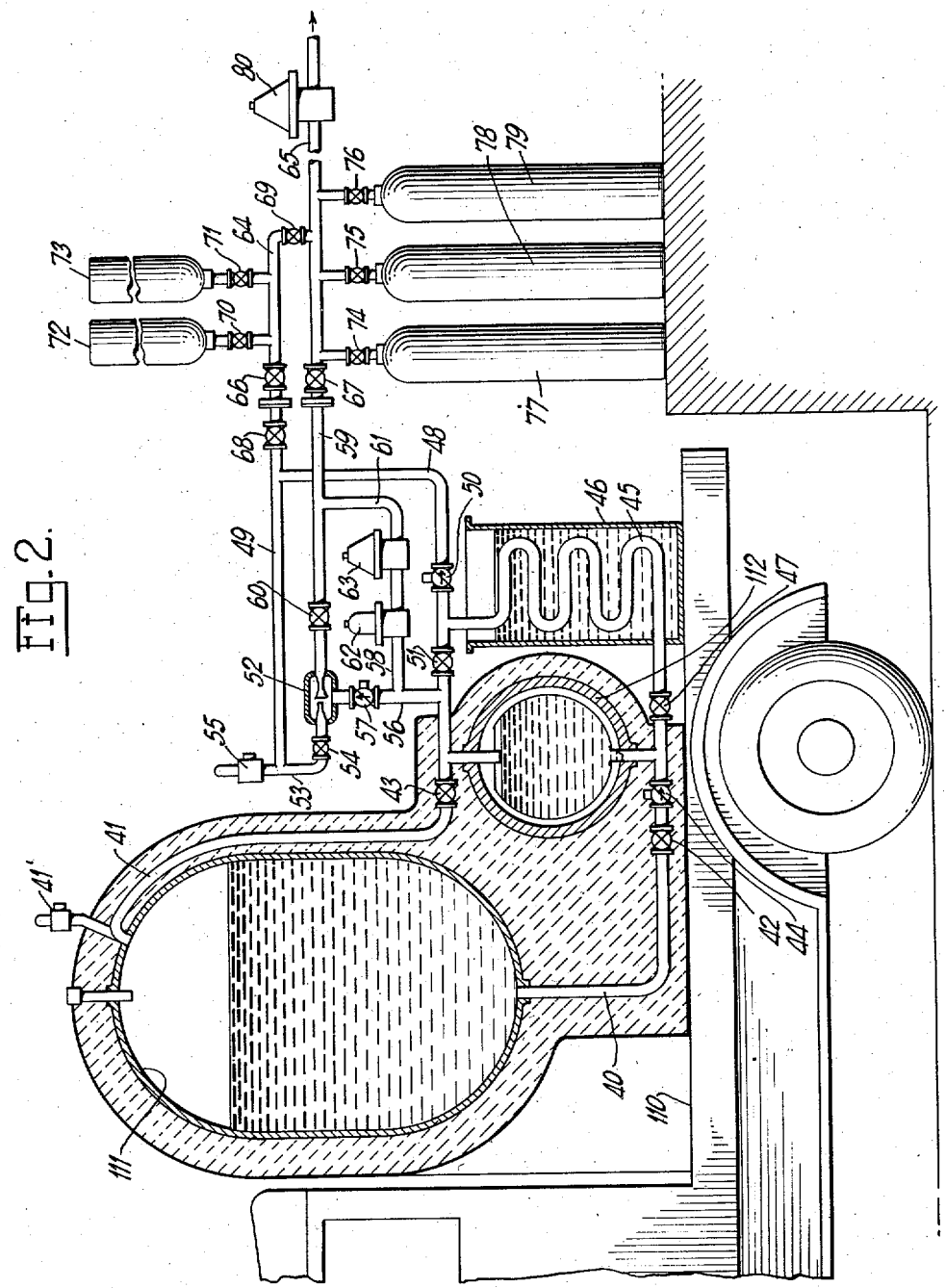

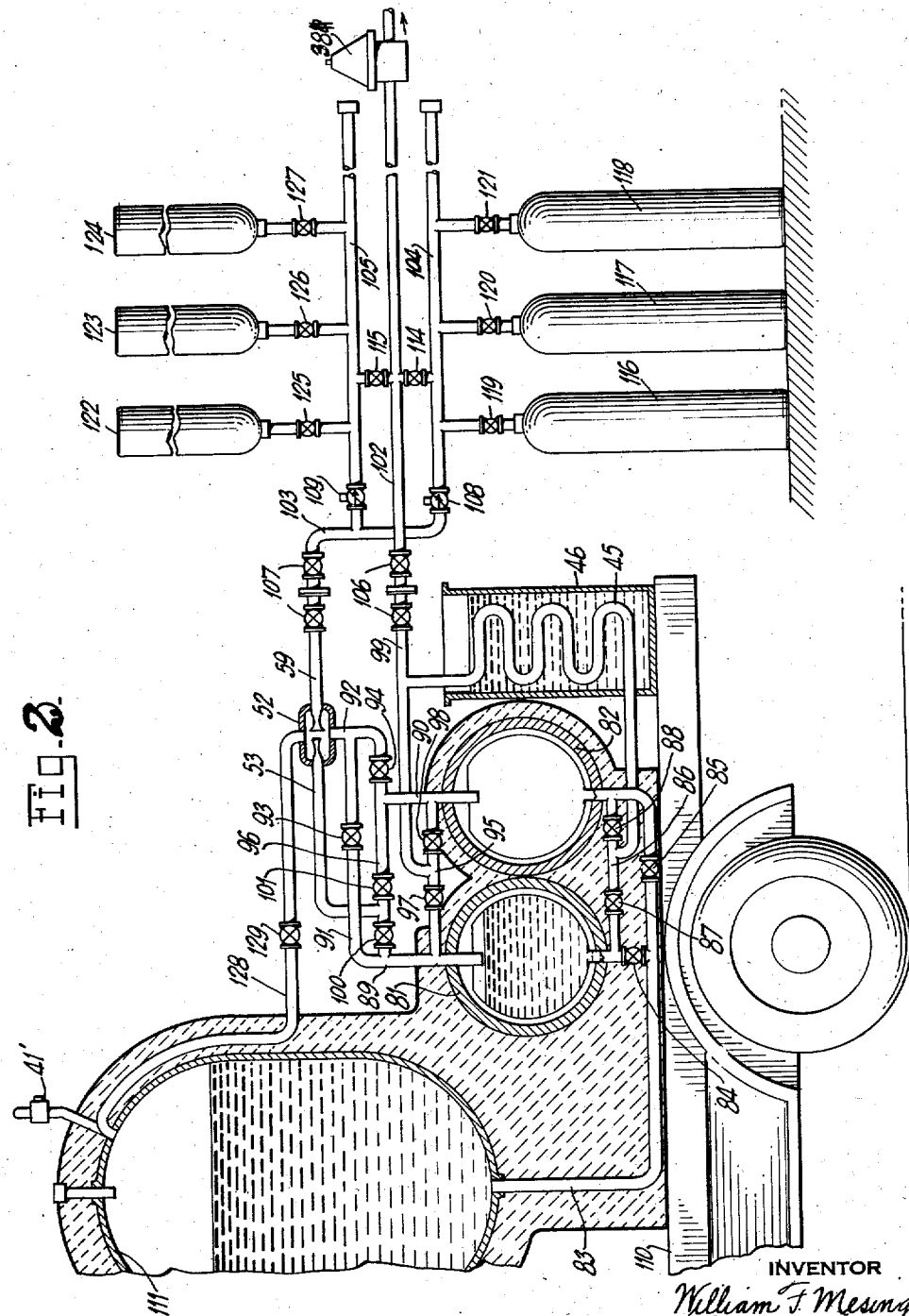

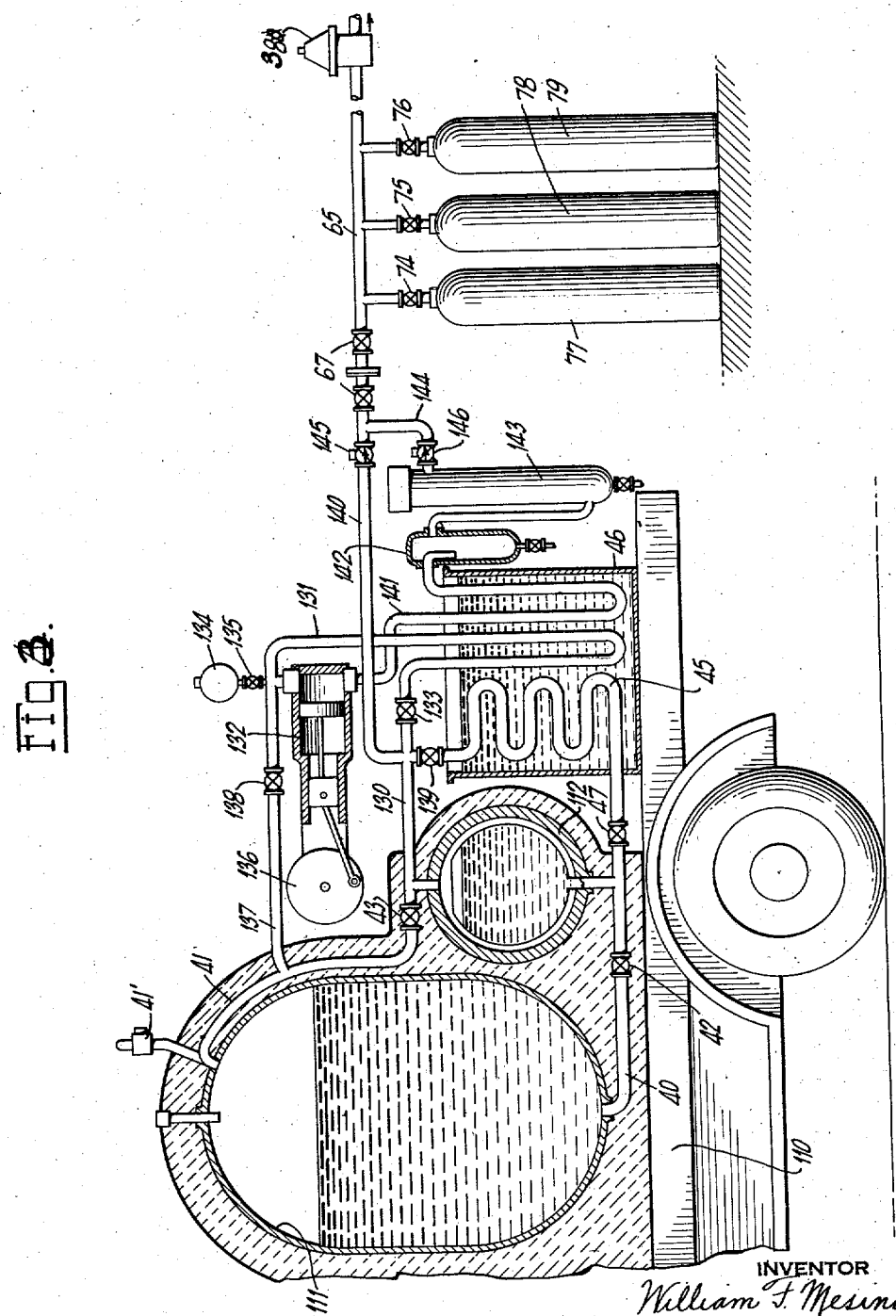

Patented Mar. 24, 1936

2,035,396

UNITED STATES PATENT OFFICE 2,035,396

METHOD AND APPARATUS FOR DISPENSING GAS MATERIAL

William F. Mesinger, Flushing, N. Y., assignor to The Linde Air Products Company, New York, N. Y., a corporation of Ohio Application March 1, 1935, Serial No. 8,819

25 Claims. (Cl. 62—1)

This invention relates to methods and apparatus for dispensing gas material, particularly gas material in the liquid phase derived from gases which have low boiling points at normal atmospheric pressure, and has for its object generally to provide a method and suitable apparatus for supplying such gas material in the gas phase to consuming apparatus in a manner which is efficient and economical in the use of liquid material.

More specifically, it is an object to provide a method and apparatus for producing gas of a desired high pressure to be stored at a place of use, generated from liquefied gas initially at low pressure, in a manner which involves the expenditure of relatively little energy.

It is also an object to provide a method and apparatus for transferring a liquefied gas, such as liquid oxygen, from a container in which it is transported at relatively low pressure to vaporizing and receiving means for converting the same into gas of relatively high pressure in a quick and expeditious manner.

It is a further object to provide a portable converting means, to be associated with a portable container on the transport vehicle, which is adapted to supply gas material in both the liquid and gaseous phases under considerable pressure, irrespectively of the low pressure in the transport container, and has a capacity such that a number of consumers may be serviced in succession and the time of transfer to their apparatus reduced.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention of which will be indicated in the claims.

For a fuller understanding of the nature and objects of the invention reference should be had to the following detailed description taken in connection with the accompanying drawings, in which:

Fig. 1 is a view, partly in section and partly in elevation, of an apparatus constructed for the practices of the invention;

Fig. 2 is a similar view of another form of apparatus for converting liquefied gas into gas of a desired high pressure adapted for the practice of the present invention;

Fig. 3 is a similar view of another form of apparatus adapted for conserving gas which is displaced by liquefied gas when the liquid is transferred to the vaporizing device; and Fig. 4 is a similar view of still another form of apparatus adapted for conserving gas when converting liquefied gas to gas of a desired high pressure.

Liquefied gases which boil at relatively low temperatures when under atmospheric pressure, such, for example, as liquid oxygen, nitrogen, and the like, are usually transported in well insulated containers while under a relatively low pressure. This is desirable as it avoids the danger of transporting such liquids when they contain a quantity of releasable energy, that is, energy stored in the liquid when it is in equilibrium with its vapor at a relatively high pressure. Heretofore, when it was desired to deliver a given quantity of gas at relatively low pressure, a portion of liquid was customarily transferred into a vaporizer located at the place where the gas material is used, the vaporizer closed and the charge of liquid vaporized by inflow of heat through the walls of the vaporizing vessel. Before filling such a vaporizing vessel, it was necessary to release to the atmosphere gas remaining in the vaporizer from a previous filling, so that the liquid at low pressure could be introduced.

By the present invention, pressure of gas remaining in the vaporizer is utilized to effect a quick transfer of gas material from a transfer vessel on the transport vehicle into the vaporizer which is of a very simple type. A single combination of transferring apparatus with a liquefied gas transporting vessel carried on the transport vehicle can service a number of consumer installations.

Referring now to the drawings and particularly to Fig. 1, a portable container of the heat insulated type for holding liquefied gas at relatively low pressure is shown generally at A supported on a transport vehicle 10, the main body of liquid being contained within the spherical, relatively thin walled vessel 11. On the same vehicle there is disposed a second vessel or converter B which transfers gas material received from container A to a receiving device C located at the place where gas is to be consumed. The converter B comprises a relatively heavy walled pressure resistant vessel 12 which is completely surrounded by insulation to protect it from the influence of atmospheric heat. The heat insulating material 10' surrounds both the transport container 11 and the transfer vessel 12, both of which are preferably of spherical form as shown in this embodiment, the former being of larger capacity. A thin walled inner vessel or basket 12' is disposed within the spherical transfer vessel 12 to hold the charge of liquefied gas out of contact with the heavy wall of the vessel. Leading from the lower portion of the basket 12' a conduit 13 conducts liquid out through an extension of the vessel wall to a valve 14 which has an operating stem leading to a point outside of the insulation. A conduit 16 connects valve 14 to one half of the coupling 15. A conduit 17 connects with the lowermost portion of vessel 12, passing over to the container A, where it continues in a portion arranged in thermal contact with the wall of container 11, finally passing back to and joining the upper portion of vessel 12 to communicate with the gas space therein. Conduit 17 is also provided with a branch conduit 17' controlled by a valve 17" to provide a gaseous communication between container A and converter B. For filling the vessel 12, there is provided a connection 18 passing through the insulation and normally closed by a plug 19. For releasing gas during the filling operation and for determining when the desired liquid level is reached, there is provided a connection 20 controlled by a valve 21 at its external end and terminating internally at the desired level. When it is desired to discharge gas material to the receiving device C, a conduit 33 having a controll valve 34 is coupled to coupling 15 and conducts the gas material to a vaporizer portion 35 which is associated with the receiving device and is preferably heated by the atmosphere, but may also advantageously be heated by other means, for example, by a water bath. In communication with the vaporizer 35 is a receiver 36 for holding gas material in the gas phase at a relatively high pressure and a pipe line 37 discharging to consuming apparatus, not shown. A pressure reducing valve 38 is preferably inserted in the pipe line 37 for automatically reducing the pressure of the gas passing therethrough to a substantially constant value desired for consumption. While only one receiving vessel is shown at 36, it will be readily understood that a plurality of such vessels may be employed, which may be connected in parallel when it is desired to provide a large or reserve supply of gas to be drawn upon when desired. The vaporizer 35 may also be arranged to be carried upon the vehicle when expedient, as will be described in connection with other forms of the apparatus. For equalizing gas pressures, communication is made between the gas spaces of vessel 12 and the vaporizer 35 comprising conduit 22 connected to the upper portion of vessel 12, controlled by valve 23 and terminating in one-half of separable coupling 24, and conduit 25 connected between the other half of coupling 24 and a gas containing portion of vaporizer 35 and controlled by a valve 26. Gas having the desired high pressure after vaporization in vaporizer 35 is conducted into and stored in the receiver 36 and discharged to consuming apparatus through conduit 37 communicating with both receiver 36 and vaporizer 35 after passing through a pressure regulating device 38. For transferring liquid from container A to vessel B there is provided an eduction conduit 31 leading from a point in the lowest portion of the liquid in container 11 to a point outside the insulation where it is provided with a removable portion 31' arranged to connect with the conduit 18 at times when plug 19 is removed and it is desired to fill vessel B with liquid. The conduit 31 is controlled by a stop valve 32 whose operating stem projects outside of the insulation.

Means are also shown for accelerating the transfer of liquid from container A into vessel B. This comprises a vaporizing conduit 27 communicating with the container 11 at its lower and upper portions and having a vaporizing portion outside of the insulation 10' heated by the atmosphere. The flow of liquid into the vaporizing portion is controlled by a valve 28 which is operable from without the insulating envelope. Gas for providing the temporary pressure above the liquid in container 11 may also be derived from another source, for example, from vessel B through connection 17', or from device C by providing an appropriate communicating passage. For assisting to keep the vessel 12 cold during periods when it is not in use for transferring gas material, the gas evaporated as a result of heat leak into the stored liquid in container A is passed in thermal contact with the wall of vessel 12 by means of a conduit 29, which branches from the portion of conduit 27 that connects to the gas space of container 11 and is coiled in contact with the outer wall of container 12, terminating at a point outside of the insulation where it is controlled by a valve 30. Other auxiliary devices of known variety, not shown in the drawings, are provided for determining the pressure and the amount of liquefied gas in container A and for releasing gas from the container if a desired pressure should be exceeded.

In operation when the pressure in receiver 36 has been reduced substantially to the pipe line pressure, it is time to refill it. The transport vehicle 10, carrying a supply of liquefied gas at relatively low pressure held in the container A and gas in the converter B, is thereupon moved into position, so that conduit 33 may be coupled to coupling 15 and conduit 25 to coupling 24, the valves 14, 23, 26, 30 and 34 being closed. The valve 17" is opened for a period sufficient to pass enough gas from converter B, where it has been held from a previous operation, to raise the pressure in vessel A a desired amount. Thereafter, valve 21 is opened, the plug 19 of connection 18 removed and the connection 31' established in position. With valve 32 open, liquid is forced through conduits 31 and 31' into the basket 12', the flow being preferably further accelerated by maintaining the temporarily increased pressure in the space above the liquid in container A by methods taught in Patent No. 1,753,785 issued to C. W. P Heylandt, which teaches the use of the vaporizing conduit 27 for this purpose. The vapors evolved from the liquid in cooling the thin metal walls of the basket are displaced and discharged at valve 21. The conduit 20 shows when the basket has filled to the desired level by an appearance of liquid in the gas discharged at this point. When the basket is filled, valve 32 is closed, connection 31' removed and the plug replaced to seal connection 18 and valve 21 is closed.

The converter B is now prepared for transferring its charge of gas material to the receiving device C. Valves 23, 26, 14 and 34 are opened and liquefied gas flows due to hydraulic head from vessel 12 into the vaporizer 35. When the liquid is completely discharged and converted into gas of the desired high pressure in the vaporizer, the valves are closed and couplings 15 and 24 disconnected to permit the vehicle to leave. During transportation, valve 30 is open to permit escape of evaporation products when it is desired to transport the liquefied gas while under substantially atmospheric pressure. Gas remaining in vessel B at first having a substantial pressure, is gradually cooled by circulation through the portion of conduit 17 in contact with container 11 while being carried to another place of use. When the converter is coupled to another receiver similar to vaporizer C, a portion of the gas material in the converter is discharged to the receiver by opening the valves 23, 26, 14 and 34 until the pressures equalize, whereby that portion of the gaseous remainder is utilized.

It will be seen that a certain quantity of gas must be released to the atmosphere by closing valves 14 and 23 and opening valve 21 before the vessel B can be refilled with another charge of liquid. Before such release, however, another portion of gas is utilized to provide the desired discharge pressure in container A by the opening of valve 17" until the desired pressure is reached. To further reduce such losses, means may be employed for utilizing these gases as shown in connection with the forms of the apparatus illustrated in Figs. 2, 3 and 4. This provides an important further advantage in that the transfer vessel may be smaller and therefore lighter so that the vaporizer may also be carried on the vehicle.

Referring now to Fig. 2, disposed upon the vehicle 110, the container 111 for holding the liquid is shown connected to the transfer vessel 112 by liquid and gas conduits 40 and 41 respectively, flow through each being controlled by valves 42 and 43. Also controlling conduit 40 is a check valve 44 which prevents back flow of gas material from vessel 112 to container 111 if the pressure in vessel 112 should be higher during a time when valve 42 is open. Also communicating with the liquid space of vessel 112 is a conduit 45 provided with a vaporizing coil portion submerged in a heating fluid that is held within a jacket 46. Flow of liquid into the coil portion is controlled by a valve 47 while gas produced by vaporization flows into the conduit 48 to which the upper end of conduit 45 is connected. Conduit 48 communicates with the upper portion of vessel 112 and conducts gas to the upper gas discharge conduit 49. The flow through conduit 48 from the vaporizer 45 toward conduit 49 is controlled by a check valve 50 so that reverse flow from conduit 49 is prevented. A stop valve 51 is interposed in conduit 48 to control communication between the vaporizer 45 and vessel 112.

For exhausting gas from vessel 112 and discharging it to means for utilizing the gas, there is provided an ejector 52 whose nozzle is supplied with high pressure actuating gas from conduit 49 through a connection 53 which is controlled by a valve 54. Also in communication with conduit 49 there is provided a safety release valve 55 for venting gas if a desired high pressure should be exceeded. The suction chamber of the ejector is connected to be in communication with the upper portion of vessel 112 through a connection 56 which has a check valve 57 arranged to permit flow toward the ejector and prevent flow in the reverse direction. The ejector discharges through conduit 59 which conducts the gas to the receiving apparatus. Such discharge is controlled by valve 60 in the conduit 59. For by-passing the ejector a by-pass connection 61 is arranged to conduct gas from the portion of connection 56 in communication with vessel 112 to conduit 59. The flow through this by-pass is controlled successively by a back pressure valve 62 which opens only when a desired pressure at its inlet is exceeded and by a pressure reducing valve 63 which closes when a desired lower pressure in its discharge is exceeded.

The two discharge conduits 49 and 59 are, when it is desired to supply gas to the receiving apparatus, detachably coupled to manifold conduits 64 and 65 respectively of the receiving apparatus. These are controlled by valves 66 and 67 to prevent loss of gas when the portable supply apparatus is disconnected and a valve 68 in conduit 49 is provided for a similar purpose. The manifolds are also joined by a connection controlled by valve 69. Branches of manifold 64 controlled by valves 70 and 71 conduct gas to high pressure receivers 72 and 73 respectively and branches of manifold 65 controlled by valves 74, 75 and 76 conduct gas to the receivers 77, 78 and 79 respectively. While only three such receivers are shown, any number which will provide the desired gas storage capacity may be provided. Gas is discharged to consuming apparatus on demand through an extension of manifold 65 that is controlled by a pressure regulating valve 80.

To supply gas to the receivers which have been discharged to a relatively low pressure or to all the receivers if at low pressure, the transfer vessel 112 is charged with a portion of the liquefied gas by opening valves 42 and 43. As liquid enters, heat stored in the walls of vessel 112 causes the vaporization of some liquid and the gas produced flows into container 111 to increase the pressure therein a relatively small degree. When the desired amount of liquid has been transferred, valve 43 is closed and valves 68, 66, 70, 67, 74, 47 and 51 are opened. Liquid then flows under the force of gravity from vessel 112 into conduit 45, being vaporized in the heated portion thereof to form gas having a constantly increasing pressure, which gas flows into the upper portion of vessel 112 and through check valve 50 to the receiver 72. When the liquid is evaporated, the system comprising vessel 112, vaporizer 45 and cylinder 72 will be filled with gas having a relatively high pressure which, however, is just below the pressure that causes back pressure valve 62 to open. Before refilling vessel 112, its pressure must be reduced. This is accomplished partially by first closing valves 47 and 51, opening valve 60, which allows gas to flow from vessel 112 through the conduit system comprising connection 56, check valve 57, ejector chamber 52, conduit 59, manifold 65 into receiver 77, the flow continuing until the pressures in receiver 77 and vessel 112 are equalized. The ejector is next operated to draw more gas from vessel 112 by opening valve 54 so that gas stored at the high pressure in receiver 72 and vaporizer 45 may flow through the actuating nozzle to entrain and compress gas in the discharge tube of the ejector from which it flows to receiver 77. When the pressure in receiver 77 rises to such a value that gas can no longer be compressed into it by the ejector, the valve 74 is closed and valve 75 opened, making the more empty receiver 78 available for receiving the gas. If the pressure in vessel 112 is reduced to a value lower than that in container 111, liquid will be drawn through check valve 44 into the vessel 112. When, however, the pressure in vessel 112 still exceeds that in container 111, valve 43 is also opened to equalize the pressures, excess gas being vented by the relief valve 41'. When the desired quantity of liquid has been transferred, the converter vessel is connected with the vaporizer 45 by opening valves 47, 51, and 74, valves 43, 54, 60 and 75 having been closed. As before, the development of gas under increasing pressure first recharges receiver 72 with gas having a desired high pressure value, which pressure is the highest reached in the system. This pressure, having been reached, further expansion of gas by heating causes back pressure valve 62 to open allowing gas to flow through it and through the reducing valve 63 by way of by-pass 61, conduit 59, and manifold 65 to complete the filling of receiver 77 to the final pressure desired, which is relatively high but less than that which causes the back pressure valve 62 to open. The filling of receivers 78 and 79 is completed by repetition of the cycle of operation. Gas under pressure will finally remain in vessel 112 and vaporizer 45, which gas may preferably be retained during transportation and discharged to another receiving apparatus. During consumption of the stored supply of gas it is desirable that the gas be drawn first from the receivers connected to manifold 65 and preferably in the reverse order in which they were filled.

In the form of the apparatus shown in Fig. 3, two transfer vessels 81 and 82 are provided for filling and discharging alternately, the high pressure gas produced in the vessel discharging to the vaporizer being utilized in the ejector for drawing off and compressing gas when filling the other vessel. Liquid is conducted from container 111 to the vessels through a conduit 83 which has branches leading into vessels 81 and 82 controlled by valves 84 and 85 respectively. The two branches are also in communication through a connection 86 having stop valves 87 and 88 between which the vaporizing conduit 45 joins connection 86 so that liquid may flow to the vaporizer from vessel 81 when valve 87 is open or from vessel 82 when valve 88 is open. The vessels 81 and 82 are also provided with connections 89 and 90 respectively communicating with their upper portions and with conduits 91 and 92 which conduct gas to the suction chamber of ejector 52, the flow being controlled by valves 93 and 94. The connections 89 and 90 are joined by two cross connections 95 and 96. Connection 95 has two valves 97 and 98 for controlling the flow of gas to conduit 99 from vessels 81 and 82 respectively and connection 96 has valves 100 and 101 for controlling the flow of gas from vessels 81 and 82 to the conduit 53 for supplying the actuating gas to ejector 52. The conduit 99 also communicates with the gas outlet end of vaporizer 45 and is detachably connected with the gas supplying conduit 102. Similarly, the discharge conduit 59 of ejector 52 is detachably connected to the receiver manifolds 104 and 105. Valves 106 in conduits 99 and 102 are provided for closing the ends of the conduits when disconnected. Similarly, valves 107 are provided in conduits 59 and 103. In manifolds 104 and 105 check valves 108 and 109 are provided, arranged so that flow can occur only from connection 103 into the manifolds. The manifolds 104 and 105 may also be placed in communication with the conduit 102 through cross connections controlled by valves 114 and 115 respectively. The valved branches of the manifolds lead to a number of high pressure receivers, thus receivers 116, 117, 118 receive gas from manifold 104 when valves 119, 120 and 121 respectively are open, and receivers 122, 123 and 124 receive gas from manifold 105 when the valves 125, 126 and 127 are open. To draw gas from the gas space of container 111 to the suction chamber of ejector 52, or for passing gas in the reverse direction when desired, the conduit 128 controlled by valve 129 is provided.

In operation, the transfer vessel 81 is first charged with a supply of liquid by opening valves 84, 93 and 129 (all other valves being closed). The displaced gas flows through conduits 89, 91, 92 and 128 into container 111. When the desired liquid level is reached, these valves are closed and valves 87 and 97 opened so that liquid runs into the vaporizer 45 where it is converted into gas of high pressure. This gas is utilized to draw a charge of liquid into vessel 82 by opening valves 94, 100, 107, 119 and lastly 85. The high pressure gas in vessel 81 flows to the ejector nozzle through conduits 89 and 53, drawing gas through conduits 92 and 90 from vessel 82 and discharging the combined gases at a lower pressure to receiver 116 through conduits 59, 103 and 104. When vessel 82 is charged, valves 85, 94, 87 and 97 are closed and valve 93 opened for a short time until the pressure of gas in vessel 81 and receiver 116 become equalized. Valves 88 and 98 are opened to discharge liquid from vessel 82 to the vaporizer 45 and generate gas of high pressure which is utilized in the ejector when recharging vessel 81. The valve 119 is closed and valves 120, 93, 101 and lastly 84 are opened.

By repetitions of the cycle of operation, the filling of receiver 117 is completed and that of receiver 118 is started. During the operations of filling receivers connected to manifold 104, the supply of gas to the consuming apparatus may be maintained by holding valve 115 and valve 125 open so that gas may flow from receiver 122 to conduit 102 and through the reducing valve 80. When cylinders of manifold 104 are charged, valve 115 is closed and valve 114 is opened. Valve 125 is closed and valve 126 opened so that receiver 123 may receive ejected gas while the charging of receiver 118 is completed. Thereafter, the remaining receivers connected to manifold 105 are charged successively.

Under certain conditions dependent upon the kind of gas material and relation between the capacities and pressures of the transfer vessels and the receivers, the back pressure of the gas in the selected receiver may develop to a value that will cause the ejector to stop drawing gas from the transfer vessel being filled before a desired quantity of liquid has entered. In such case, the supply of actuating gas to the ejector is shut off, for example, by closing valve 100 or 101, opening valves 106 to pass the compressed gas to the receiver being charged and opening valve 129 to complete the filling of the transfer vessel being charged by flow under the influence of gravity.

In the form of the apparatus shown in Fig. 4 a gas pump is provided for drawing gas from the upper portion of the transfer vessel when filling same. The transfer vessel 112 receives liquid from the container 111 and discharges it to the vaporizer 45 by means similar to that shown in Fig. 2, but in this form of apparatus gas is drawn from the upper portion of vessel 112 through conduit 130 and conduit 131 which communicates, when desired, with conduit 130 and with the suction valve chamber of a gas compressor 132, the flow through conduit 131 being controlled by stop valve 133. The conduit 131 has a coil portion submerged in the heating fluid of the jacket 46 so that gas flowing into the compressor will be heated to a temperature that is above the freezing point of the lubricant used to lubricate the piston of the compressor. The lubricant, which is preferably water when the gas being compressed is oxygen, is added in controlled amounts to the suction chamber by a feeder chamber 134 having a regulating valve 135. The compressor is driven by conventional means such as a connecting rod and crank disk 136 which are driven by an electric motor through reduction gearing (not shown). The motor may receive power from a storage battery or electric generator on the vehicle or the disk 136 may be driven from the truck engine through the medium of a mechanical drive connection. A conduit 137 controlled by valve 138 provides communication between the compressor suction chamber and conduit 41 so that gas may be drawn from the container 111 and compressed for utilization at a higher pressure when desired.

The discharge end of vaporizer 45 also communicates with conduit 130 and is controlled by a stop valve 139. Still another conduit 140 connects with conduit 130 for conducting gas to the manifold 65 to which it is detachably connected by the coupling between stop valves 67. The compressed gas from the discharge valve chamber of compressor 132 is conducted by a conduit 141, which is provided with a coil portion submerged in the fluid in jacket 46 for imparting heat to the fluid, to the inlet of a lubricant re-removal trap 142 which separates particles of lubricant carried by the gas. The gas then flows in series through a chemical containing trap 143 which removes lubricant in the vapor state and through conduit 144 which joins conduit 140. Check valves 145 and 146 are provided in conduits 140 and 144 to allow gas to flow in the direction toward the junction of the two conduits and prevent flow in the reverse direction.

When it is desired to charge the receivers with gas, valves 133, 67 and 74 are opened and the compressor operated. The compressor draws gas from vessel 112, forcing it after treatment in the traps 142 and 143 into the manifold 65 which conducts it into receiver 77. Upon next opening valve 42, the vessel 112 will fill with liquid, when the compressor is stopped and valves 42 and 133 are closed and valves 47 and 139 opened. The liquid thereupon discharges into the vaporizer 45 where it is vaporized and heated to be converted into gas of relatively high pressure which flows into receiver 77 to complete the charging thereof. The other cylinders are charged successively by repeating the operation, cylinder 78 being charged by holding the valve 74 closed and the valve 75 open. When desired to increase the speed of flow of liquid into vessel 112 the pressure of gas in container 111 may be increased by opening valve 43 when the compressor is not operating. When subsequently it is desired to reduce the pressure of gas in container 111, the valve 138 may be opened while the compressor is operating.

It will be seen that the use of a single transfer vessel in connection with a vaporizing device as shown in Fig. 1 for servicing consumers with a gas at a relatively high pressure developed from the liquid state in which it is transported, provides a simple apparatus for effecting the desired results and that the forms of the apparatus of Figs. 2, 3 and 4 have the further advantage in that losses of gas to the atmosphere when filling the transfer vessel are substantially reduced or entirely eliminated by providing means for raising the pressure of such gas to a value such that it can be utilized.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. A method of transferring a liquefied gas from a region of relatively low pressure to a region of relatively high pressure, which comprises charging a transport container of the heat insulated type with a body of liquefied gas where it is maintained at a relatively low pressure, withdrawing a portion of said body into a transfer vessel while in liquid and pressure communication with said container, thereafter isolating said portion in said transfer vessel from said container, heating said withdrawn portion in said transfer vessel while isolated whereby the pressure and boiling point of said portion is elevated, and then discharging a substantial amount of said portion at said elevated pressure to receiving apparatus while conserving at least a portion of the material in the gas phase.

2. A method of transferring a liquefied gas from a region of relatively low pressure to a region of relatively high pressure, which comprises charging a transport container of the heat insulated type with a body of liquefied gas where it is maintained at a relatively low pressure, withdrawing portions of said body into a transfer vessel while in liquid and pressure communication with said container, thereafter isolating said portion in said transfer vessel from said container, elevating the pressure and the boiling point of the portion in said transfer vessel while isolated, then discharging a substantial amount of said portion at said elevated pressure to receiving apparatus while conserving at least a portion of the material in the gas phase, and during transport, transferring refrigeration from the body of liquefied gas in the transport container to said second portable vessel.

3. The method of dispensing gas material to storage and consuming apparatus which comprises charging a transport container of the heat insulated type with a body of liquefied gas where it is maintained at a relatively low pressure when transported, transferring a desired portion of liquid from said container to a second portable vessel, isolating said portion from said charge and introducing heat to elevate the pressure and boiling point of said portion, discharging gas material having said elevated boiling point at a place of use, and completely vaporizing and heating the same to a desired temperature whereby gas having a desired pressure is supplied to the storage and consuming apparatus.

4. The method of supplying oxygen for industrial use which comprises charging a transport container of the heat insulated type with a charge of liquid oxygen where it is maintained at a relatively low pressure when transported, transferring a portion of said liquid oxygen charge to a second portable vessel, isolating said portion from communication with said charge, heating said portion to effect an elevation of both the pressure and the boiling point of same, discharging oxygen from said second vessel at said elevated boiling point to a receiving device including a stationary vaporizer, and completely vaporizing said discharge portion in said stationary vaporizer to provide gaseous oxygen to be supplied at a desired high pressure.

5. The method of dispensing gas material which comprises charging a transport container of the heat insulated type with a charge of liquefied gas where it is maintained at a relatively low pressure when transported, transferring when at a place of use a desired portion of liquid from said container to a second portable vessel, isolating said portion from said charge, separating a third portion from said second portion, applying heat to said third portion while maintaining the portions in communication whereby both portions are completely vaporized and converted to gas having a desired elevated pressure, and discharging gas to storage and consuming apparatus.

6. The method of dispensing gas material which comprises charging a transport container of the heat insulated type with a charge of liquefied gas where it is maintained at a relatively low pressure when transported, transferring a desired portion of liquid from said container to a second portable vessel, isolating said portion from said charge, providing access of heat to said portion for completely vaporizing and converting same to gas having the desired pressure, discharging a major portion of said gas to storage and consuming apparatus, and utilizing the energy of a portion of the stored gas for assisting the transfer of liquid into said second vessel.

7. The method of dispensing gas material which comprises charging a transport container of the heat insulated type with a charge of liquefied gas where it is maintained at a relatively low pressure when transported, transferring a desired portion of liquid from said container to a second portable vessel, isolating said portion from said charge, flowing said portion through a heated zone whereby said portion is completely vaporized, heated and converted to gas having a desired pressure, discharging heated gas to storage and consuming apparatus, and conserving at least a portion of the material in the gas phase.

8. The method of dispensing gas material to consuming apparatus including storage receivers which comprises charging a transport container of the heat insulated type with a charge of liquefied gas where it is maintained at a relatively low pressure when transported, transferring a desired portion of liquid from said container to a second portable vessel, isolating said portion from said charge, flowing said portion through a heated zone whereby said portion is completely vaporized, heated and converted to gas having a desired pressure, discharging heated gas to storage and consuming apparatus, and assisting the flow of liquid into said second vessel by drawing off vapors therefrom.

9. The method of dispensing gas material to consuming apparatus including storage receivers which comprises charging a transport container of the heat insulated type with a charge of liquefied gas where it is maintained at a relatively low pressure when transported, transferring a desired portion of liquid from said container to a second portable vessel, isolating said portion from said charge, flowing said portion under the influence of the force of gravity through a heated region thereby converting said portion into gas having a desired elevated pressure and temperature, discharging a major portion of said gas to the receivers, and conserving at least a portion of the gas that is displaced from the second portable vessel before refilling the same with another portion of liquid.

10. The method of dispensing gas material to consuming apparatus including storage receivers which comprises charging a transport container of the heat insulated type with a charge of liquefied gas where it is maintained at a relatively low pressure when transported, transferring a desired portion of liquid from said container to a second portable vessel, isolating said portion from said charge, flowing said portion through a heated zone whereby said portion is completely vaporized, heated and converted to gas having a desired pressure, discharging heated gas to storage and consuming apparatus, and assisting the flow of liquid into said second vessel by drawing off vapors therefrom and compressing said vapors to a pressure desired for utilization.

11. The method of dispensing gas material to consuming apparatus including storage receivers which comprises charging a transport container of the heat insulated type with a charge of liquefied gas where it is maintained at a relatively low pressure when transported, transferring a desired portion of liquid from said container to a second portable vessel, isolating said portion from said charge, flowing said portion through a heated zone whereby said portion is completely vaporized, heated and converted to gas having a desired pressure, discharging heated gas to storage and consuming apparatus, and assisting the flow of liquid into said second vessel by drawing off vapors therefrom, compressing said vapors, and conducting said vapors compressed to the desired pressure to said storage and consuming apparatus.

12. The method of dispensing gas material to consuming apparatus including storage receivers which comprises charging a transport container of the heat insulated type with a charge of liquefied gas where it is maintained at a relatively low pressure when transported, transferring a desired portion of liquid from said container to a second portable vessel, isolating said portion from said charge, flowing said portion through a heated zone whereby said portion is completely vaporized, heated and converted to gas having a desired pressure, discharging heated gas to storage and consuming apparatus, and assisting the flow of liquid into said second vessel by drawing off vapors therefrom, and compressing said vapors by means of the energy of gas having a relatively high pressure produced by self-compression from liquefied gas.

13. The method of providing a supply of relatively highly compressed substantially moisture free oxygen in receivers at a place of use, which comprises transporting a supply body of liquid oxygen to said place of use, converting a desired portion of said body into moisture free gaseous oxygen having the desired pressure in a manner which results in the production of a portion of gaseous oxygen having a pressure less than said desired pressure, mechanically compressing the portion of gaseous oxygen, adding moisture to said gaseous oxygen when being compressed for the purpose of lubricating the compressing device, removing moisture from said gaseous oxygen after compression to the desired pressure, and discharging the compressed and substantially moisture free oxygen to receivers.

14. The method of providing a supply of relatively highly compressed substantially moisture free oxygen in receivers at a place of use, which comprises transporting a supply body of liquid oxygen to said place of use, converting a portion of said body of liquid oxygen into gas whose pressure is less than the pressure desired, mechanically compressing said portion of gas to the pressure desired, adding compressor lubricant moisture to said gas when being compressed, removing moisture from said gas after compression, and conducting the compressed and substantially moisture free oxygen to the receivers.

15. Apparatus for dispensing gas material comprising, in combination, a portable container of the heat insulated type for holding a charge of liquefied gas, a portable heat insulated pressure vessel associated with said container and arranged to receive a portion of said charge from said container, means for closing off completely the connections between said container and pressure vessel, means for heating said pressure vessel whereby its contents is elevated to a relatively high pressure, means for transporting said container and pressure vessel, a vaporizing device for vaporizing gas material discharged from said pressure vessel, and means for conveying the vaporized material to receivers permanently installed at a place of use.

16. Apparatus for dispensing gas material comprising, in combination, a portable container of the heat insulated type for holding a charge of liquefied gas, a transport vehicle for supporting said container, a transfer vessel on said vehicle arranged to receive a portion of said charge from said container, means for closing off completely the connections between said container and said vessel, means separate from said vessel for supplying heat to the portion of the charge within said vessel whereby said portion is heated and converted into gas, and means separate from said vehicle for receiving and storing the gas material discharged from said transfer vessel.

17. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container, means for closing off completely the connections between said container and said vessel, means associated with said vessel in thermal contact with a heating medium for heating the gas material in said vessel, means for withdrawing gas material under pressure from said vessel, and means separate from said vehicle for receiving and storing the gas material withdrawn from said vessel.

18. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container and a heat exchanger communicating with the upper and lower portions of said vessel, means for closing off completely the connections between said container and said vessel, means for supplying heat to said heat exchanger for vaporizing and heating gas material in said vessel, means for withdrawing gas under pressure from said vessel, and means separate from said vehicle for receiving and storing the gas withdrawn from said vessel.

19. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container, means for closing off completely the connections between said container and said vessel, means for accelerating the transfer of portions of liquefied gas from said container to said vessel, and means separate from said vehicle for receiving the gas material withdrawn from said vessel.

20. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container, means for closing off completely the connections between said container and said vessel, means for drawing gas from said vessel for accelerating the transfer of portions of liquefied gas from said container to said vessel, and independent means for receiving and storing gas from said vessel after vaporization.

21. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container, means for drawing gas from said vessel to accelerate the transfer of portions of liquefied gas from said container to said vessel, said means including a device for compressing said withdrawn gas, and means for receiving and storing gas from said vessel after vaporization and for receiving gas from said compressing device.

22. Apparatus for dispensing gas material comprising, in combination, a portable container of the heat insulated type for holding a charge of liquefied gas, a transport vehicle for supporting said container, a vaporizer on said vehicle having a pressure vessel arranged to receive portions of said charge from said container, means for receiving and storing gas from said vessel produced by vaporization, and means for utilizing the energy of stored gas for drawing gas from said vessel for accelerating the transfer of liquefied gas from said container to said vessel and for compressing the withdrawn gas for utilization.

23. Apparatus for dispensing gas material comprising, in combination, a portable container of the heat insulated type for holding a charge of liquefied gas, portable pressure resisting vessels associated with said container and arranged to receive portions of said charge from said container, heat exchangers associated with said vessels for vaporizing and heating gas material therein, means utilizing the energy of gas produced by vaporization of liquefied gas from one of said vessels for withdrawing and compressing gas from the other of said vessels during the transfer of a portion of liquid from said container to said latter vessel, and means for receiving and storing gas withdrawn from said vessels.

24. Apparatus for dispensing gas material comprising, in combination, a portable container of the heat insulated type for holding a charge of liquefied gas, portable pressure resisting vessels associated with said container and arranged to receive portions of said charge from said container, heat exchangers associated with said vessels for vaporizing and heating gas material therein, means for withdrawing and compressing gas from one of said vessels to accelerate the transfer into it of liquefied gas from said container while gas material in the other of said vessels is heated, and means for receiving gas discharged from both of said vessels.

25. A method of transferring liquefied gas from a region of relatively low pressure to a region of relatively high pressure, which comprises providing a supply of liquefied gas at relatively low pressure in a transportable container of the heat insulated type, periodically withdrawing portions of said supply to an isolatable heat insulated transfer vessel while in communication with said container, isolating said portions between withdrawal periods when in said transfer vessel, supplying energy during said periods of isolation to raise the pressure of said portions to a value intermediate the values obtaining in said regions of low and high pressures respectively, and thereafter discharging the withdrawn portions to a receiver where the desired high pressure may be attained.

WILLIAM F. MESINGER.

Certificate of Correction

Patent No. 2,035,396. March 24, 1936.

WILLIAM F. MESINGER

It is hereby certified that errors appear in the printed specification of the above numbered patent requiring correction as follows: Page 4, second column, line 21, for "receive" read *receiver*; in the drawings, sheet 3, for "Fig. 2" read *Fig. 3*; and for the reference numeral "380" read *80*; and sheet 4, for "Fig. 3" read *Fig. 4*; and for the reference numeral "380" read *80*; and that the said Letters Patent should be read with these corrections therein that the same may conform to the record of the case in the Patent Office.

Signed and sealed this 5th day of May, A. D. 1936.

[SEAL]

LESLIE FRAZER,
*Acting Commissioner of Patents.* gas from one of said vessels to accelerate the transfer into it of liquefied gas from said container while gas material in the other of said vessels is heated, and means for receiving gas discharged from both of said vessels.

25. A method of transferring liquefied gas from a region of relatively low pressure to a region of relatively high pressure, which comprises providing a supply of liquefied gas at relatively low pressure in a transportable container of the heat insulated type, periodically withdrawing portions of said supply to an isolatable heat insulated transfer vessel while in communication with said container, isolating said portions between withdrawal periods when in said transfer vessel, supplying energy during said periods of isolation to raise the pressure of said portions to a value intermediate the values obtaining in said regions of low and high pressures respectively, and thereafter discharging the withdrawn portions to a receiver where the desired high pressure may be attained.

WILLIAM F. MESINGER.

Certificate of Correction

Patent No. 2,035,396.                                    March 24, 1936.

WILLIAM F. MESINGER

It is hereby certified that errors appear in the printed specification of the above numbered patent requiring correction as follows: Page 4, second column, line 21, for "receive" read *receiver*; in the drawings, sheet 3, for "Fig. 2" read *Fig. 3*; and for the reference numeral "380" read *80*; and sheet 4, for "Fig. 3" read *Fig. 4*; and for the reference numeral "380" read *80*; and that the said Letters Patent should be read with these corrections therein that the same may conform to the record of the case in the Patent Office.

Signed and sealed this 5th day of May, A. D. 1936.

[SEAL]

LESLIE FRAZER,
*Acting Commissioner of Patents.*

Certificate of Correction

Patent No. 2,035,396. March 24, 1936.

WILLIAM F. MESINGER

It is hereby certified that errors appear in the printed specification of the above numbered patent requiring correction as follows: Page 4, second column, line 21, for "receive" read *receiver;* in the drawings, sheet 3, for "Fig. 2" read *Fig. 3;* and for the reference numeral "380" read *80;* and sheet 4, for "Fig. 3" read *Fig. 4;* and for the reference numeral "380" read *80;* and that the said Letters Patent should be read with these corrections therein that the same may conform to the record of the case in the Patent Office.

Signed and sealed this 5th day of May, A. D. 1936.

[SEAL] LESLIE FRAZER,
*Acting Commissioner of Patents.*